United States Patent
Schiffmann et al.

(10) Patent No.: US 12,394,575 B2
(45) Date of Patent: Aug. 19, 2025

(54) ENERGY STORE INCLUDING A HOUSING AND BRIDGE PLUG

(71) Applicant: SEW-EURODRIVE GMBH & CO. KG, Bruchsal (DE)

(72) Inventors: Sebastian Schiffmann, Kronau (DE); Claus Schöpfer, Wiesloch (DE); Thomas Zöller, Bruchsal (DE); Matthias Hauck, Schwetzingen (DE); Jens Schäfer, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 809 days.

(21) Appl. No.: 17/616,820

(22) PCT Filed: May 27, 2020

(86) PCT No.: PCT/EP2020/025248
§ 371 (c)(1),
(2) Date: Dec. 6, 2021

(87) PCT Pub. No.: WO2020/244804
PCT Pub. Date: Dec. 10, 2020

(65) Prior Publication Data
US 2022/0310331 A1    Sep. 29, 2022

(30) Foreign Application Priority Data
Jun. 6, 2019 (DE) .......... 102019003969.6

(51) Int. Cl.
*H01G 11/78*    (2013.01)
*H01M 10/42*    (2006.01)
(Continued)

(52) U.S. Cl.
CPC .......... *H01G 11/78* (2013.01); *H01M 10/425* (2013.01); *H01M 50/204* (2021.01);
(Continued)

(58) Field of Classification Search
CPC ............. H01M 50/204; H01M 50/284; H01M 50/271; H01M 50/583; H01M 10/425; H01G 11/78
See application file for complete search history.

(56) References Cited

U.S. PATENT DOCUMENTS

| | | |
|---|---|---|
| 6,243,250 B1 | 6/2001 | Cater |
| 7,645,145 B2 | 1/2010 | Soma |

(Continued)

FOREIGN PATENT DOCUMENTS

| | | |
|---|---|---|
| CN | 1234633 A | 11/1999 |
| CN | 101511644 A | 8/2009 |

(Continued)

OTHER PUBLICATIONS

International Preliminary Report on Patentability issued in corresponding International Application No. PCT/EP2020/025248 dated Dec. 7, 2021, pp. 1-6.

(Continued)

*Primary Examiner* — Karie O'Neill Apicella
(74) *Attorney, Agent, or Firm* — Carter, DeLuca & Farrell LLP

(57) ABSTRACT

An energy store includes a housing and bridge plug. In relation to the housing, the bridge plug is receivable by the housing in two orientations different from each other, e.g., in the same opening or configuration of openings.

20 Claims, 8 Drawing Sheets

(51) Int. Cl.
*H01M 50/204* (2021.01)
*H01M 50/271* (2021.01)
*H01M 50/284* (2021.01)
*H01M 50/583* (2021.01)

(52) U.S. Cl.
CPC ....... *H01M 50/271* (2021.01); *H01M 50/284* (2021.01); *H01M 50/583* (2021.01); *H01M 2010/4271* (2013.01)

(56) References Cited

U.S. PATENT DOCUMENTS

| | | | |
|---|---|---|---|
| 8,912,758 | B2 | 12/2014 | Jung-Soo et al. |
| 9,343,829 | B2 | 5/2016 | Martin |
| 9,761,856 | B2 | 9/2017 | Sangyeon et al. |
| 10,109,835 | B2 | 10/2018 | Yang |
| 2009/0075520 | A1 | 3/2009 | Takaya et al. |
| 2011/0302773 | A1 | 12/2011 | Chattot |
| 2013/0288530 | A1 | 10/2013 | Weiping |
| 2014/0062589 | A1* | 3/2014 | Schenk ............. H03F 3/68 361/290 |
| 2015/0303446 | A1 | 10/2015 | Jung |
| 2018/0205058 | A1 | 7/2018 | Chang-Bok et al. |
| 2019/0020072 | A1 | 1/2019 | Gaston et al. |
| 2019/0267588 | A1* | 8/2019 | Okada ................. H01M 50/204 |

FOREIGN PATENT DOCUMENTS

| | | |
|---|---|---|
| CN | 104802740 A | 7/2015 |
| CN | 206250243 U | 6/2017 |
| DE | 102012223561 A1 | 6/2014 |
| DE | 102014200188 A1 | 7/2015 |
| DE | 102014017081 A1 | 5/2016 |
| DE | 102015213849 A1 | 1/2017 |
| DE | 102017115589 B3 | 1/2019 |
| JP | 2016051684 A | 4/2016 |

OTHER PUBLICATIONS

International Search Report issued in corresponding International Application No. PCT/EP2020/025248 dated Jul. 21, 2020, pp. 1-2, English Translation.

Office Action issued by the European Patent Office on Feb. 10, 2025 in corresponding EP Patent Application No. 20729943.9, with English translation.

* cited by examiner

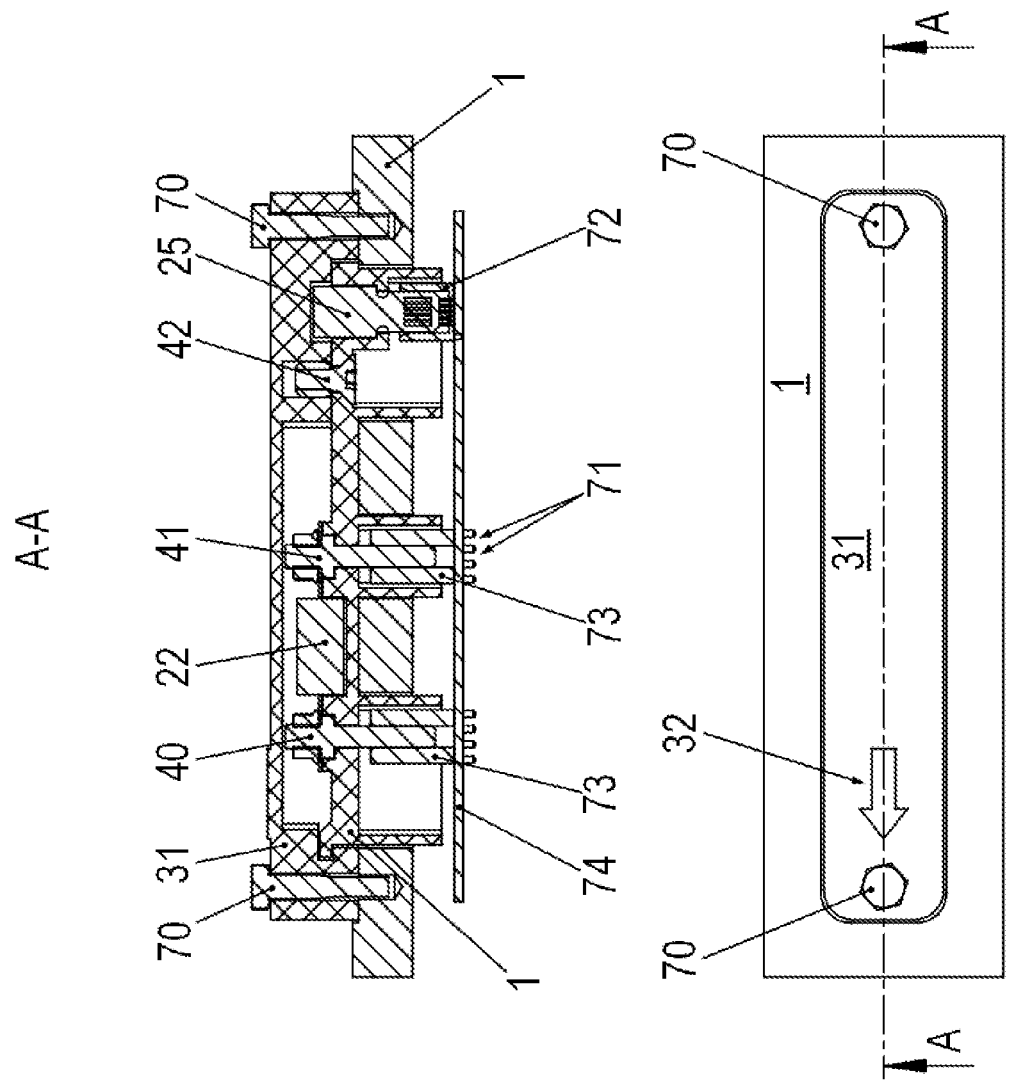

ENERGY STORE INCLUDING A HOUSING AND BRIDGE PLUG

FIELD OF THE INVENTION

The present invention relates to an energy store including a housing and bridge plug.

BACKGROUND INFORMATION

In certain arrangements, an energy store, in particular, a storage battery, should be protected from a high level of discharge.

A connecting plug for stacked electrical power modules is described in U.S. Pat. No. 10,109,835.

A connection set-up for contacting a battery module electrically is described in German Patent Document No. 10 2014 017 081.

A method for manufacturing a battery module is described in U.S. Patent Application Publication No. 2019/0020072.

A battery module is described in U.S. Pat. No. 9,761,856.

A method for manufacturing electrical power modules is described in U.S. Patent Application Publication No. 2011/0302773.

A battery connection system is described in U.S. Patent Application Publication No. 2013/0288530.

A battery cell having a cell terminal formed like a socket and a corresponding cell connector is described in German Patent Document No. 10 2012 223 561.

A wiring harness for connecting a plurality of battery cells electrically conductively and monitoring them electronically is described in German Patent Document No. 10 2014 200 188.

A method for manufacturing such a plug-and-socket connection is described in German Patent Document No. 10 2015 213 849.

A battery for a vehicle is described in German Patent Document No. 10 2017 115 589.

A power storage apparatus is described in U.S. Pat. No. 8,912,758.

A protective switching circuit module for a battery module is described in U.S. Patent Application Publication No. 2015/0303446.

SUMMARY

Example embodiments of the present invention provide for protecting an energy store from a high level of discharge.

According to an example embodiment of the present invention, an energy store includes a housing and bridge plug, and, in relation to the housing, the bridge plug may be received by the housing in two orientations different from each other, e.g., in the same opening or configuration of openings.

In this context, it is considered advantageous that in the state as delivered, one or more current paths may be cut off, and consequently, a high level of discharge is preventable. Not until initial operation, may the bridge plug be brought into the other orientation and, consequently, the current paths be unblocked. Then, during operation, the energy store is charged intermittently, and therefore, a high level of discharge may be prevented.

According to example embodiments, the housing includes a cover part; the bridge plug having an upper part and a lower part connected to the upper part, e.g., with the aid of a screw; the upper part being connected to the cover part, e.g., with the aid of screws, which are screwed into tapped holes of the cover part at least partially, and whose screwheads, for example, push the upper part towards the cover part; the lower part being situated, for example, between the upper part and the cover part. In this context, it is considered advantageous that the electrotechnical components, such as the cutout and electrical connections, may be mounted in a simple manner, since these may be attached in the lower part and may be securely insulated by putting the upper part onto the lower part.

According to example embodiments, regions, e.g., projections, e.g., hollow shells, projecting towards the interior of the energy store surrounded by the housing are formed on the lower part; each of the regions protruding, in each instance, at least partially through an opening passing through the cover part; for example, the regions being set apart from each other, and the respective openings being set apart from each other, as well. In this context, it is considered advantageous that the contact pins are surrounded by the projections so as to be set apart laterally, that is, radially, and consequently, insulating strength may be attained. In addition, the regions guide the bridge plug while it is plugged onto the cover part, e.g., while the regions are inserted into the corresponding openings of the cover part.

According to example embodiments, a cutout, e.g., a cutout connecting two terminals electrically, is situated in the bridge plug; for example, the first terminal of which being detachably connected electrically to a first contact pin, e.g., a first contact pin accommodated in the lower part; and the second terminal of which being detachably connected electrically to a second contact pin, e.g., a second contact pin accommodated in the lower part. In this context, it is considered advantageous that the cutout may only be activated during operation, since in the state as delivered, the current path leading through the cutout is cut off.

According to example embodiments, the first region of the lower part surrounds a first contact pin at least partially, and the second region of the lower part surrounds a second contact pin at least partially. In this context, it is considered advantageous that the insulating strength of the bridge plug is attainable in a simple manner, that is, merely by shaping and material selection.

According to example embodiments, a circuit board piece is accommodated in the lower part; for example, on its first side, e.g., upper side, the circuit board piece includes circuit traces, which are each connected electrically to circuit traces situated on the other side, e.g., lower side, of the circuit board piece, with the aid of, e.g., plated-through holes; for example, a third region of the lower part surrounding the circuit board piece at least partially. In this context, it is considered advantageous for the signal lines to be able to be cut off or disconnected in a simple manner, for the circuit board piece includes interconnected circuit traces on two sides for conduction. Consequently, the signal lines may be connected by inserting the circuit board piece into a connecting piece. This is because each of the signal lines ends, on one hand, on a first side of the connecting part, which is contacted electrically with the upper side of the circuit board piece upon the insertion of the circuit board piece into the connecting part, and, on the other hand, on the other side of the connecting part, which is contacted electrically with the lower side of the circuit board piece upon insertion of the circuit board piece into the connecting part.

According to example embodiments, in the first of the orientations of the bridge plug, a current path of the energy store leads through the cutout; for example, the current path connecting a potential of an energy storage module of the energy store to a terminal for a potential of the energy store;

and in the second of the orientations of the bridge plug, the current path being cut off. In this context, it is considered advantageous that in the state as delivered, a high level of discharge is prevented, and therefore, the cutoff is not capable of being activated. However, the cutoff is capable of being activated during operation.

According to example embodiments, in the first of the orientations of the bridge plug, signal lines connect signal electronics of the energy store to energy storage set-ups of the energy store with the aid of the circuit board piece; for example, the signal lines being run to controllable semiconductor switches of the signal electronics; and in the second of the orientations of the bridge plug, the signal lines being cut off. In this context, it is considered advantageous that the state as delivered, or the operating state, may be established by orienting the bridge plug.

According to example embodiments, in the first of the orientations of the bridge plug, the circuit board piece is received and/or inserted in the connecting part. In this context, it is considered advantageous that simple manufacture of the cutout may be implemented. This is because the circuit board piece must only be received in the bridge plug, so that when the bridge plug is plugged on in the orientation provided for operation, the signal lines are unblocked, that is, no longer cut off. In the plugging direction, that is, in the direction of insertion of the bridge plug into the cover part, the circuit board piece is connected in a form-locked manner. This may be implemented in a simple manner by a depression, which is introduced on the side of the circuit board piece, and into which a projection of the lower part extends.

According to example embodiments, in the first of the orientations, the first contact pin is received in a first socket part, the second contact pin is received in a second socket part, and the first socket part, the second socket part, and the connecting part are inserted on a circuit board of a or the signal electronics of the energy store. In this context, it is considered advantageous that simple manufacturing is rendered possible.

According to example embodiments, in the second of the orientations, the first contact pin is received in the first socket part, and the second contact pin is set apart from the circuit board of the signal electronics and not connected, e.g., not to the first socket part inserted on the circuit board. In this context, it is considered advantageous that a high level of discharge is preventable.

According to example embodiments, the first and the second socket parts are each made of metal. In this context, it is considered advantageous that simple manufacturing is rendered possible; since the socket part is inserted and electrically conductive, no further component is necessary on the side of the circuit board.

According to example embodiments, the bridge plug includes an indicating device. In this context, it is considered advantageous that the orientation may be recognized simply and rapidly.

According to example embodiments, the signal lines of the signal electronics are fed through controllable semiconductor switches; the controllable semiconductor switches being closed in response to the application of a deblocking signal to an input, e.g., signal input, of the energy store, and otherwise open. In this context, it is considered advantageous that the energy store has a signal input, so that a deblocking signal may be supplied by a primary control unit, and in this manner, the specific operating state of the energy store is controllable during operation. For example, the signal electronics include a balancer circuit, which monitors the voltages applied to the specific energy storage set-ups and controls the charging and/or discharging as a function of the voltage. If, for example, one energy storage set-up is already charged completely, but another is not yet, then a controlling action is enabled. The deblocking signal is, for example, supplied with the aid of a second plug-and-socket connector part situated on the energy store. The power, that is, the heavy current occurring during the charging or discharging, is directed through a first plug-and-socket connector of the energy store.

Thus, according to example embodiments, the signal lines of the signal electronics are therefore fed through controllable semiconductor switches; the controllable semiconductor switches being closed in response to the application of a deblocking signal to an input, e.g., signal input, of the energy store; for example, the controllable semiconductor switches being open in response to the non-application of a deblocking signal to an input, e.g., signal input, of the energy store.

Further features and aspects of example embodiment of the present invention are described in more detail below with reference to the appended schematic Figures.

Figure 7:
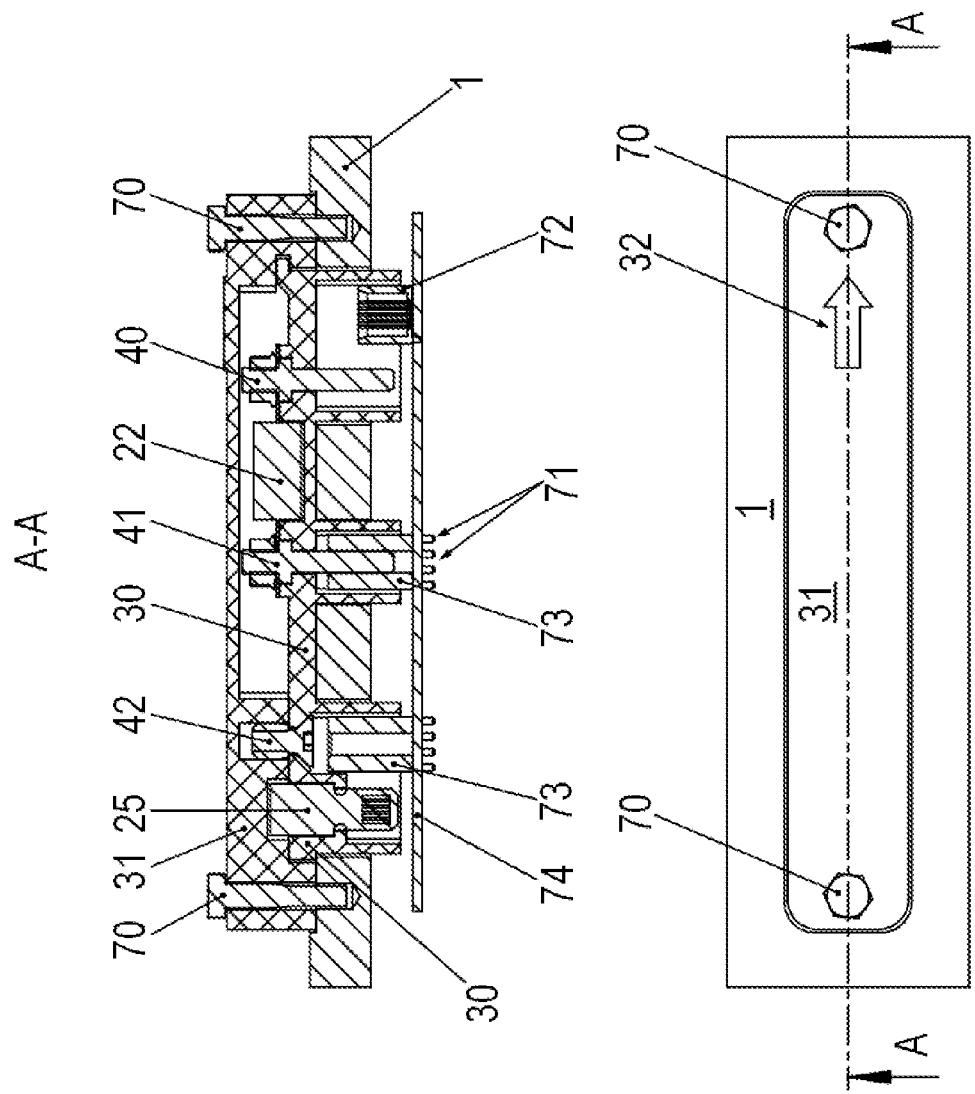
FIG. 7 is a cross-sectional view of a region of the energy store 20 including bridge plug 3, the orientation of bridge plug 3 with respect to energy store 20, for example, with respect to a cover part 1 of energy store 20, being shown in the lower region of FIG. 7.

In contrast to FIG. 7, in FIG. 8, bridge plug 3 is illustrated as being rotated 180°.

DETAILED DESCRIPTION

As schematically illustrated in the Figures, energy store 20 includes a housing part 2 and a cover part 1 placed on it.

Figure 2:
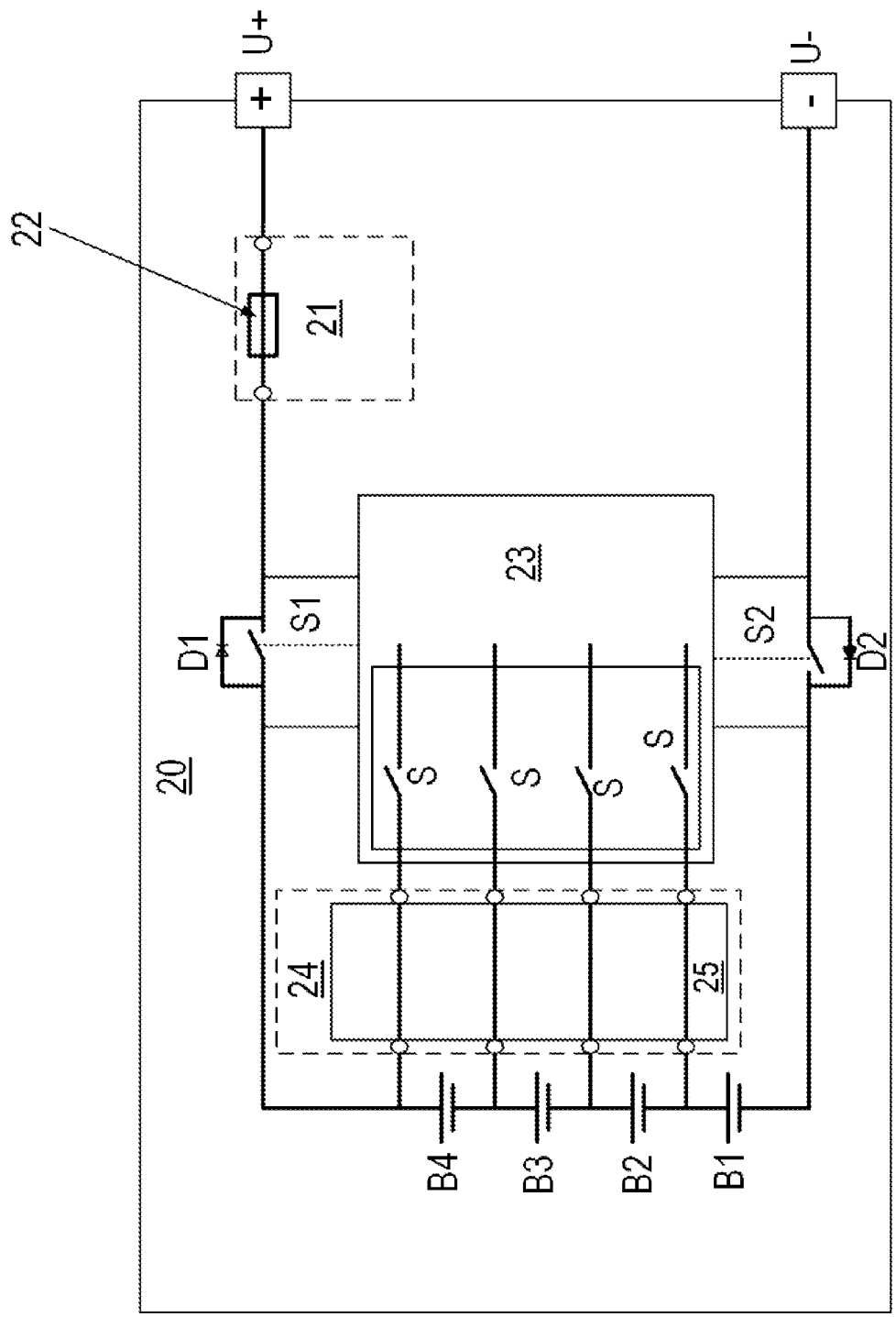
FIG. 2 is a circuit diagram of energy store 20.
Figure 3:
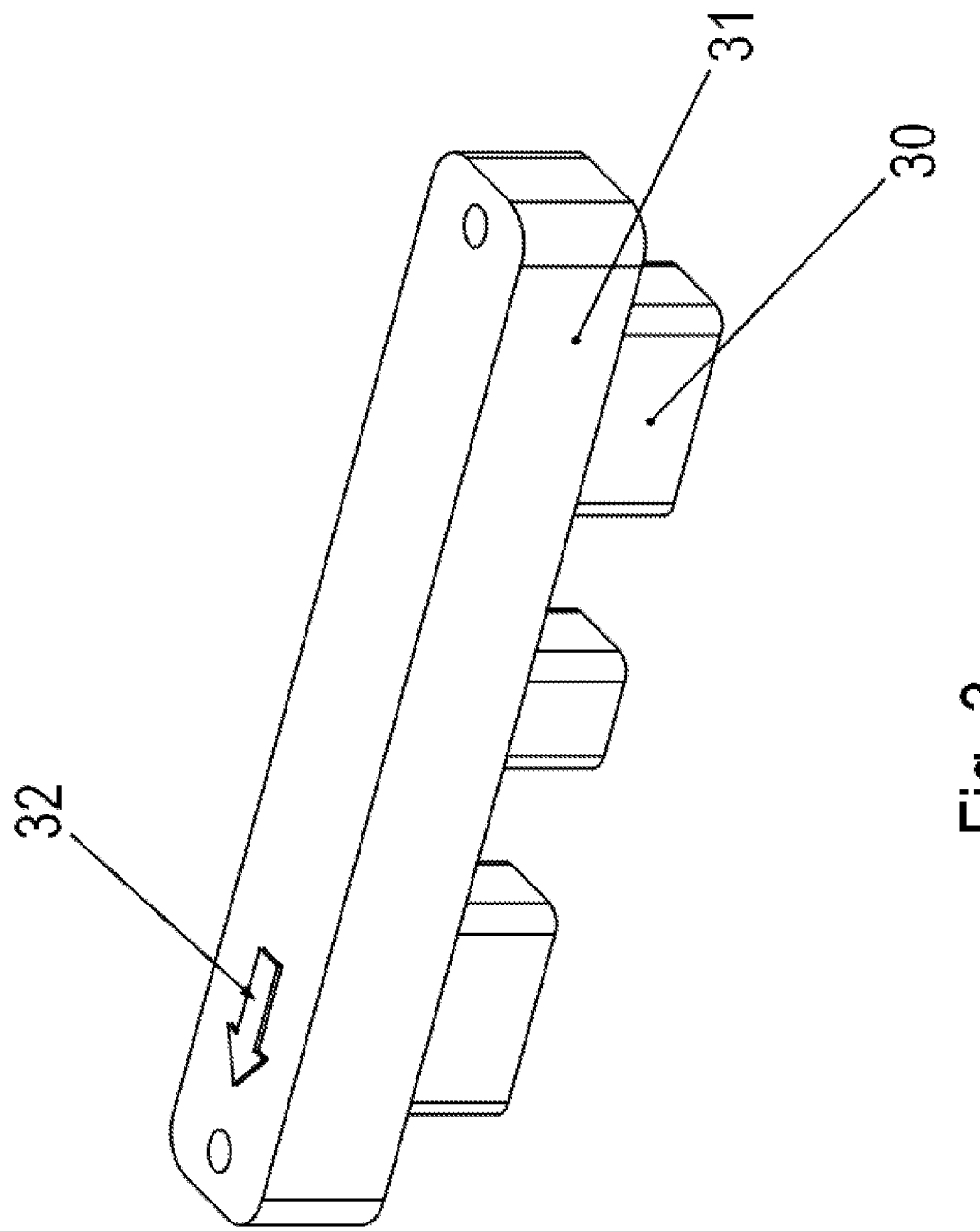
FIG. 3 is a perspective view of bridge plug 3 in a first direction of view.
Figure 4:
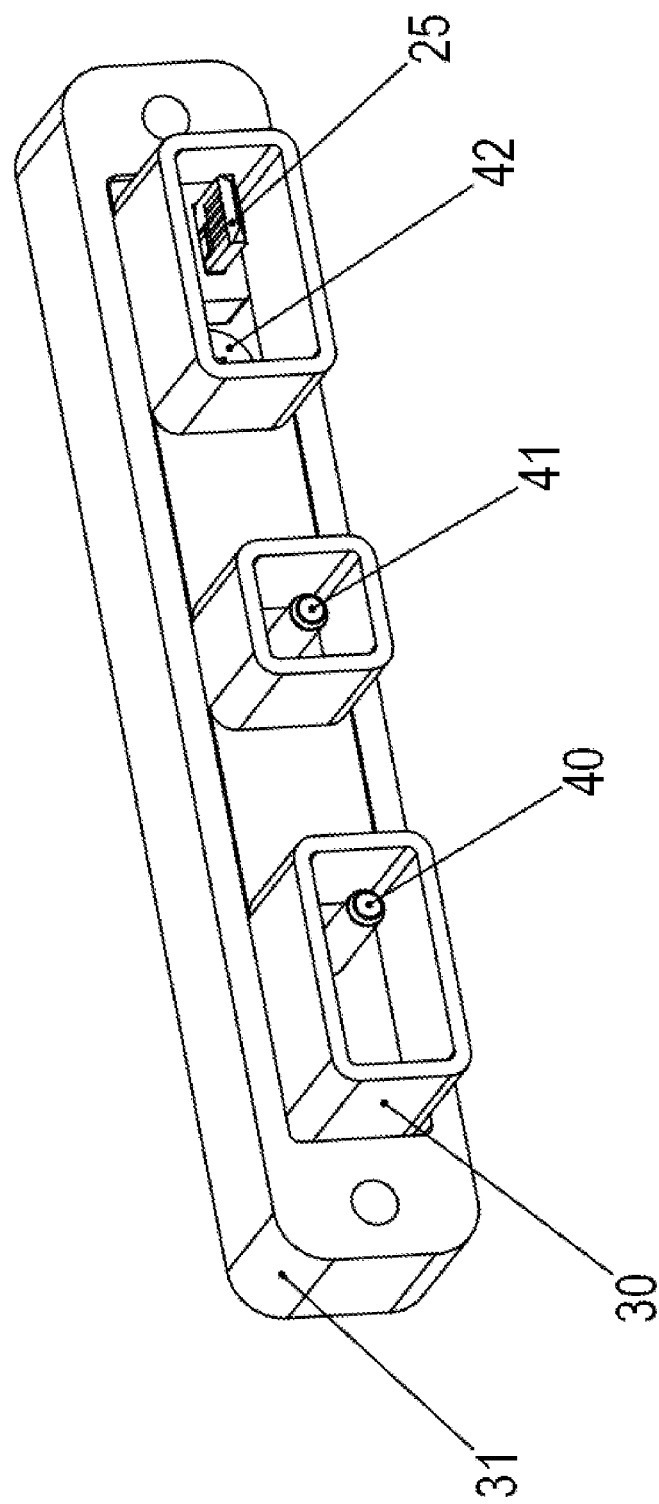
FIG. 4 is a perspective view of bridge plug 3 from a different direction of view.
Figure 5:
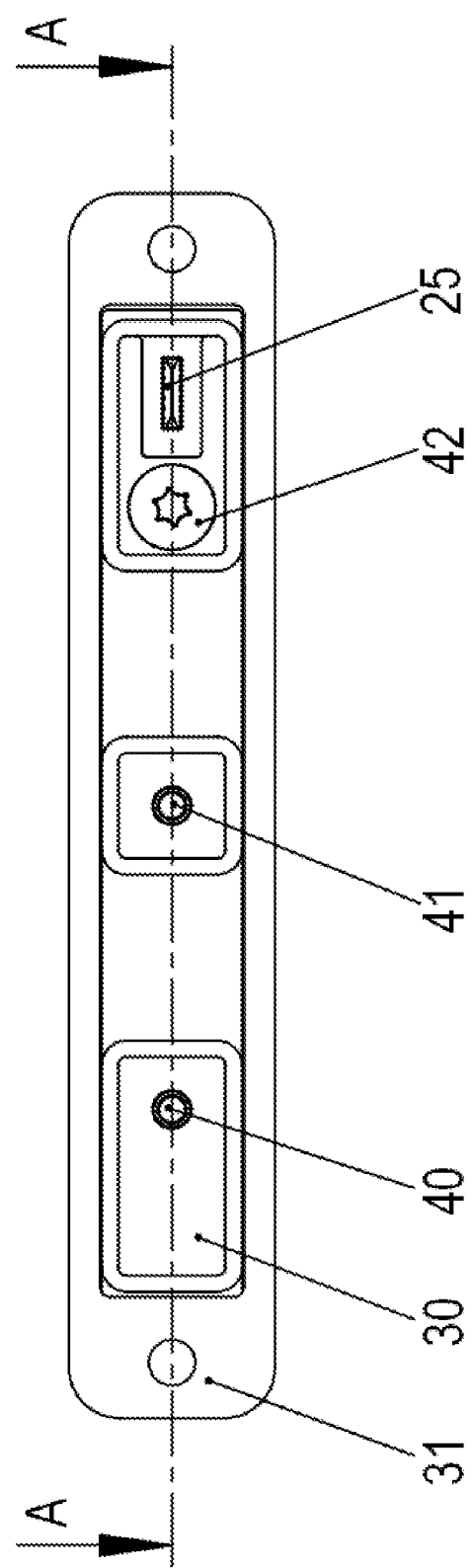
FIG. 5 is a top view of bridge plug 3.

The housing surrounds energy storage modules (B1, B2, B3, B4), which include accumulators, batteries, or double-layer capacitors, such as ultracaps. In this context, each energy storage module (B1, B2, B3, B4) may be constructed as a parallel and/or series circuit. As shown in FIG. 2, energy storage modules (B1, B2, B3, B4) are, for example, connected to each other in series; the voltage falling at each energy storage module (B1, B2, B3, B4) being fed across a respective, controllable semiconductor switch S of signal electronics 23, when these controllable semiconductor switches S are closed.

To reduce the discharging of energy storage modules (B1, B2, B3, B4), controllable semiconductor switches S are implemented as MOSFET switches having, therefore, e.g., as low a leakage current as possible, or as switches, which have a lower leakage current than MOSFET switches of the same construction type.

Fans 6 are positioned on one side of energy store 20, so that the air current transported from the surrounding area by fans 6 is conveyed through one or more cooling ducts of the energy store.

Figure 1:
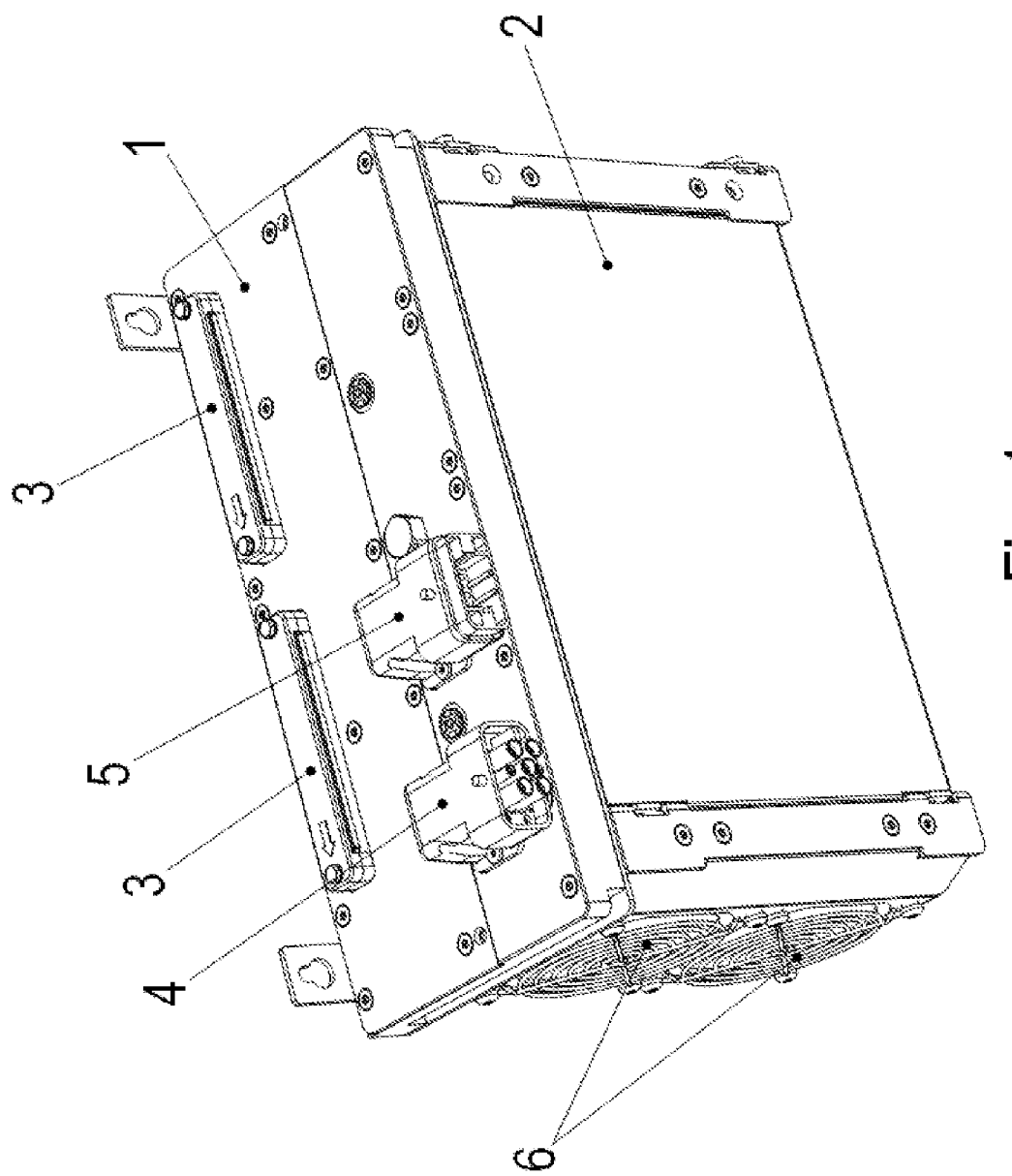
FIG. 1 is a perspective view of an energy store 20 according to an example embodiment of the present invention, including a bridge plug 3.

The energy store 1 shown in FIG. 1 includes two energy storage arrangements, which are independent of each other and identical to each other, but have a common PE-connection, e.g., neutral conductor.

Upper potential U+ of the first energy storage arrangement, lower potential U− of the first energy storage arrangement, upper potential U+ of the second energy storage arrangement, and lower potential U− of the second energy storage arrangement are lead out to a first plug-and-socket connector part 4, which is situated on cover part 1.

In addition, the signal lines of the two energy storage arrangements are brought together at a second plug-and-socket connector part 5, which is situated on the cover part.

A respective bridge plug 3 is positioned on cover part 1 for each of the two energy storage arrangements.

For the sake of simplicity, in the following, only one of the two energy storage arrangements is described, for example, and referred to as energy store 20.

From a circuitry standpoint, the two potentials (U+, U−) of the series circuit that include energy storage modules (B1, B2, B3, B4) are lead out via two controllable switches (S1, S2), e.g., controllable semiconductor switches or relays, and at least one cutout 22 at two of the contacts of first plug-and-socket connector part 4.

Diodes (D1, D2), e.g., in the form of free-wheeling diodes, are connected in parallel with controllable switches (S1, S2), respectively.

Cutout 22 is situated in a first region of bridge plug 3.

Signal lines are passed through in a second region 25 of the bridge plug, so that in this manner, the voltages applied to the specific energy storage modules (B1, B2, B3, B4) are supplied to signal electronics 23.

The signal electronics include, for example, a monitoring circuit, which checks if at least one of the voltages exceeds or falls below a threshold value.

A control signal, which is, for example, generated by a central computer of a system or machine, is sent to signal electronics 23 via one of the signal lines of second plug-and-socket connector part 5. In addition, switches S1 and S2 are controlled by signal electronics 23. Thus, if a corresponding control signal is supplied to signal electronics 23 via the above-mentioned signal line of second plug-and-socket connector part 5, these signal electronics control the two switches S1, S2, as well as switches S, in such a manner, that they each close and that energy store 20 is therefore operational.

In the state of energy store 20 as delivered, controllable semiconductor switches S and switches S1 and S2 are open. In addition, in the state as delivered, the bridge plug is positioned on energy store 20 in the orientation shown in FIG. 7, and in the operational state, in accordance with the orientation shown in FIG. 8.

Thus, in the state as delivered, cutout 22 is not connected electrically on both sides, and therefore, the flow of current is not possible. In the same manner, discharging of energy storage modules (B1, B2, B3, B4) through signal electronics 23 is prevented, since the second region of bridge plug 3 cuts off the signal lines, that is, does not allow them to conduct.

If the readiness for operation is established by removing, rotating and replacing bridge plug 3, previously in the state as delivered, the energy store may be activated by a corresponding control signal, which is supplied to signal electronics 23 via second plug-and-socket connector part 4 and then causes switches S1, S2 and also semiconductor switches S to close.

Bridge plug 3 includes a lower part 30 and an upper part 31, which is placed on it and connected, for example, by screws.

An indicating device 32, e.g., the representation of an arrow, is placed on upper part 31, in order to show the orientation of bridge plug 3 in a readily recognizable manner. Indicating device 32 is, for example, imprinted on upper part 31 or is already formed on it during the manufacture by plastic injection molding.

Three hollow-frame regions, which project towards signal electronics 23, are formed on lower part 30; socket parts 73 being receivable, e.g., insertable, in the hollow space surrounded by each of them; the socket parts being made of metal and including contact pins 71, which protrude through openings of circuit board 74 and are soldered to circuit traces of circuit board 74.

Circuit board 74 is populated with components, so that circuit board 74, together with the components, forms signal electronics 23.

Lower part 30 of bridge plug 3 includes projecting connector pins 40, 41; each of metallic connector pins 40, 41 being inserted into a respective one of the socket parts 73 and being connected in a friction-locked manner and, therefore, connected electrically.

The hollow frames of lower part 30 are guided through specific openings of cover part 1 of energy store 20.

The first 40 of the connector pins 40, 41 is connected to a first terminal of cutout 22.

The second 41 of connector pins 40, 41 is connected to a second terminal of cutout 22.

Lower part 30 is connected to upper part 31 with the aid of screw 42.

The distance from second contact pin 41 to screw 42 is equal to the distance from second contact pin 41 to first contact pin 40. The spatial region, which is overlapped by first contact pin 40 and is situated in the hollow space of the first hollow frame, is at the same distance from second contact pin 41 as a free spatial region surrounded by the third hollow frame of lower part 30.

Thus, in the two orientations of bridge plug 3, second contact pin 41 is received in the same socket part 73, and first contact pin 40 is either received in first socket part 73, e.g., in the case of operational readiness, or accommodated in the free spatial region, thus, e.g., in a contactless manner. Accordingly, circuit board piece 25 is either in a free spatial region, that is, contactless, or is contacted electrically.

However, a circuit board 25, which includes the through-lines between energy storage modules (B1, B2, B3, B4) and signal electronics 23, is also received in lower part 30.

In response to plugging on bridge plug 3 in accordance with FIG. 8, circuit board piece 25 is inserted into connecting part 72 and is consequently connected to the signal lines leading to signal electronics 23.

Figure 6:
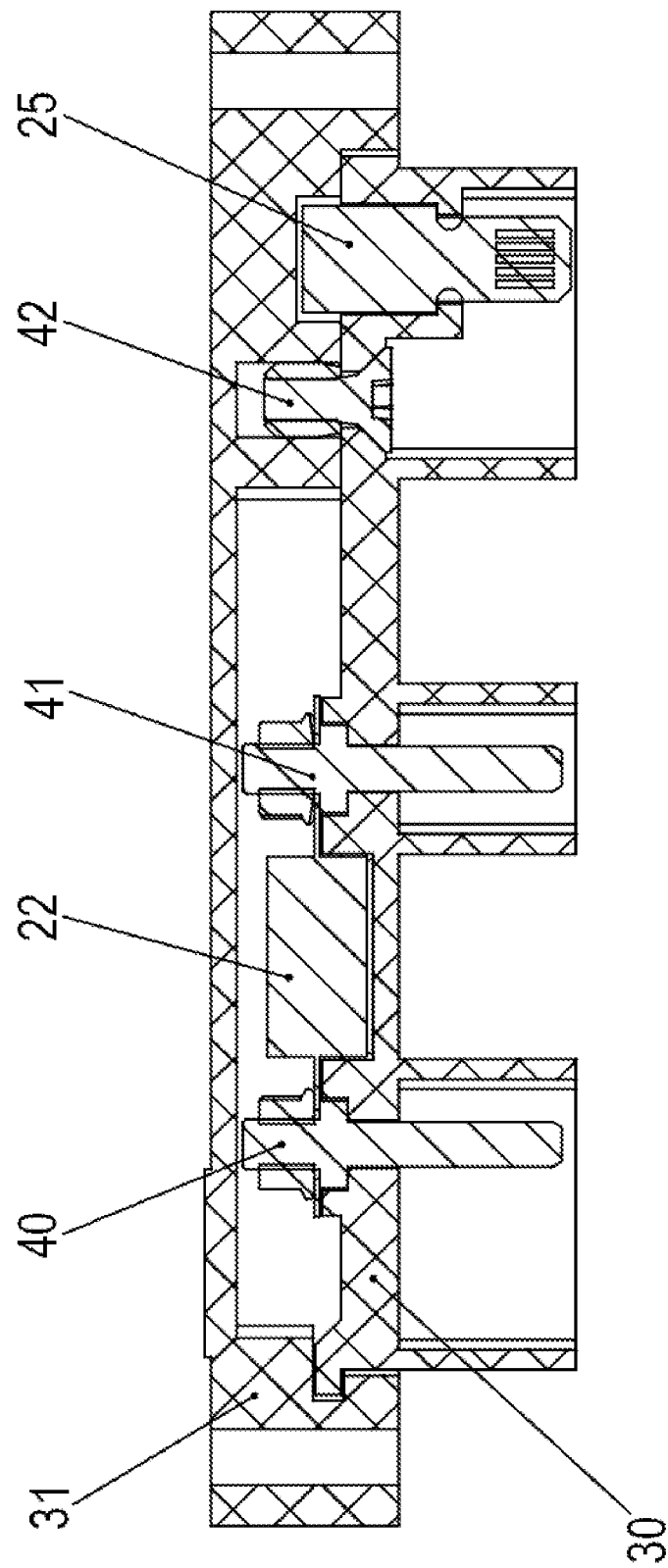
FIG. 6 is a cross-sectional view of bridge plug 3.

As illustrated in FIG. 6, the spatial region covered by the three hollow shells is specularly symmetric with respect to the axis of symmetry, that is, longitudinal axis and/or center line, of second contact pin 41.

In response to a 180° rotation, first contact pin 40 is situated in the region of screw 42 and the free spatial region below it. In the same manner, circuit board piece 25 overlaps the free spatial region in FIG. 6, which is situated between the first, in FIG. 6, left, hollow shell and first contact pin 40.

Upper part 31 is pressed onto cover part 1 with the aid of screws 70; the screws 70 being screwed into tapped holes of cover part 1.

The first and third hollow shells have the same dimension in the direction of the connecting line, which interconnects first and second contact pins 40, 41.

The circuit board 74 and cover part 1 are connected.

LIST OF REFERENCE CHARACTERS

- 1 cover part
- 2 housing part
- 3 bridge plug
- 4 first plug-and-socket connector part, e.g., for heavy current
- 5 second plug-and-socket connector part, e.g., for signals
- 6 fan
- 20 energy store
- 21 first region of bridge plug 3
- 22 cutout
- 23 signal electronics
- 24 second region of bridge plug 3
- 25 circuit board, circuit board piece
- 30 lower part of housing
- 31 upper part of housing
- 32 indicating device
- 40 connector pin
- 41 connector pin
- 42 screw
- 70 screw
- 71 contact pins
- 72 connecting part for circuit board piece 25
- 73 socket part
- 74 circuit board of signal electronics 23
- D1 diode
- D2 diode
- S controllable semiconductor switch
- S1 controllable switch, e.g., semiconductor switch or relay
- S2 controllable semiconductor switch, e.g., semiconductor switch or relay
- B1 energy storage module, e.g., ultracap or accumulator
- B2 energy storage module, e.g., ultracap or accumulator
- B3 energy storage module, e.g., ultracap or accumulator
- B4 energy storage module, e.g., ultracap or accumulator
- U+ upper potential
- U− lower potential

What is claimed is:

1. An energy store, comprising:
    a housing; and
    a bridge plug;
    wherein the housing and the bridge plug are configured such that the bridge plug is insertable into the housing in two orientations that are different from each other;
    wherein a cutout is arranged in the bridge plug and electrically connects two terminals; and
    wherein in a first orientation of the bridge plug, a current path of the energy store leads through the cutout and a current path connects a potential of an energy storage module of the energy store to a terminal for a potential of the energy store, and, in a second orientation of the bridge plug, the current path is cut off.

2. The energy store according to claim 1, wherein the housing and the bridge plug are configured such that the bridge plug is insertable into the housing in two orientations that are different from each other in a same opening and/or configuration of openings.

3. The energy store according to claim 1, wherein the housing includes a cover part, and the bridge plug includes an upper part and a lower part connected to the upper part, the upper part being connected to the cover part, the lower part being arranged between the upper part and the cover part.

4. An energy store, comprising:
    a housing; and
    a bridge plug;
    wherein the housing and the bridge plug are configured such that the bridge plug is receivable by the housing in two orientations that are different from each other;
    wherein the housing includes a cover part, and the bridge plug includes an upper part and a lower part connected to the upper part, the upper part being connected to the cover part, the lower part being arranged between the upper part and the cover part; and
    wherein the lower part is screw connected to the upper part, and the upper part is screw connected to the cover part by screws that are received in tapped holes of the cover part and that include screw heads that push the upper part toward the cover part.

5. An energy store, comprising:
    a housing; and
    a bridge plug;
    wherein the housing and the bridge plug are configured such that the bridge plug is receivable by the housing in two orientations that are different from each other;
    wherein the housing includes a cover part, and the bridge plug includes an upper part and a lower part connected to the upper part, the upper part being connected to the cover part, the lower part being arranged between the upper part and the cover part; and
    wherein regions projecting toward an interior of the energy store surrounded by the housing are formed on the lower part, each region protruding at least partially through an opening that passes through the cover part, the regions being set apart from each other, the openings being set apart from each other.

6. The energy store according to claim 5, wherein a cutout is arranged in the bridge plug and electrically connects two terminals.

7. The energy store according to claim 1, wherein a first terminal of the two terminals is detachably electrically connected electrically to a first contact pin accommodated in a lower part of the bridge plug, and a second terminal of the two terminals is detachably electrically connected electrically to a second contact pin accommodated in the lower part.

8. The energy store according to claim 1, wherein a first region of the lower part surrounds a first contact pin at least partially, and a second region of the lower part surrounds a second contact pin at least partially.

9. An energy store, comprising:
    a housing; and
    a bridge plug;
    wherein the housing and the bridge plug are configured such that the bridge plug is receivable by the housing in two orientations that are different from each other;
    wherein a circuit board piece is accommodated in the lower part, the circuit board piece includes circuit traces arranged on a first side of the circuit board piece electrically connected electrically to circuit traces arranged on a second side of the circuit board piece via plated-through holes.

10. The energy store according to claim 9, wherein a third region of the lower part surrounds the circuit board piece at least partially.

11. The energy store according to claim 6, wherein in a first orientation of the bridge plug, a current path of the energy store leads through the cutout and a current path connects a potential of an energy storage module of the energy store to a terminal for a potential of the energy store, and, in a second orientation of the bridge plug, the current path is cut off.

12. An energy store, comprising:
a housing; and
a bridge plug;
wherein the housing and the bridge plug are configured such that the bridge plug is insertable into the housing in two orientations that are different from each other;
wherein in a first orientation of the bridge plug, via a circuit board piece, signal lines connect signal electronics of the energy store to energy storage devices of the energy store, and, in a second orientation of the bridge plug, the signal lines are cut off.

13. The energy store according to claim 12, wherein the energy storage device includes (a) an accumulator and (b) double-layer capacitors and/or ultracaps.

14. The energy store according to claim 9, wherein in a first orientation of the bridge plug, the circuit board piece is received and/or inserted in a connecting part.

15. An energy store, comprising:
a housing; and
a bridge plug;
wherein the housing and the bridge plug are configured such that the bridge plug is insertable into the housing in two orientations that are different from each other;
wherein a cutout is arranged in the bridge plug and electrically connects two terminals,
wherein a first terminal of the two terminals is detachably electrically connected electrically to a first contact pin accommodated in a lower part of the bridge plug, and a second terminal of the two terminals is detachably electrically connected electrically to a second contact pin accommodated in the lower par; and
wherein in a first orientation, the first contact pin is received in a first socket part, the second contact pin is received in a second socket part, and the first socket part, the second socket part, and a connecting part are provided on a circuit board of signal electronics of the energy store.

16. The energy store according to claim 15, wherein in a second orientation, the first contact pin is received in the first socket part, and the second contact pin is set apart from the circuit board of the signal electronics and not connected to the first socket part provided on the circuit board.

17. The energy store according to claim 15, wherein the first and the second socket parts formed of metal.

18. The energy store according to claim 1, wherein the bridge plug includes an indication device.

19. The energy store according to claim 15, wherein signal lines of the signal electronics are fed through controllable semiconductor switches that are closed in response to application of a deblocking signal to an input of the energy store and that are open in response to non-application of a deblocking signal to an input of the energy store.

20. An energy store, comprising:
a housing; and
a bridge plug insertable into the housing in two orientations different from each other in a same opening or configuration of openings, the bridge plug including a cutout electrically connecting two terminals;
wherein in a first one of the orientations of the bridge plug, a current path of the energy store leads through the cutout, and in a second one of the orientations of the bridge plug, the current path is cut off.

* * * * *